Aug. 31, 1965   F. HAUG ET AL   3,203,370
DOUGH MIXING AND KNEADING MACHINE
Filed Sept. 18, 1962
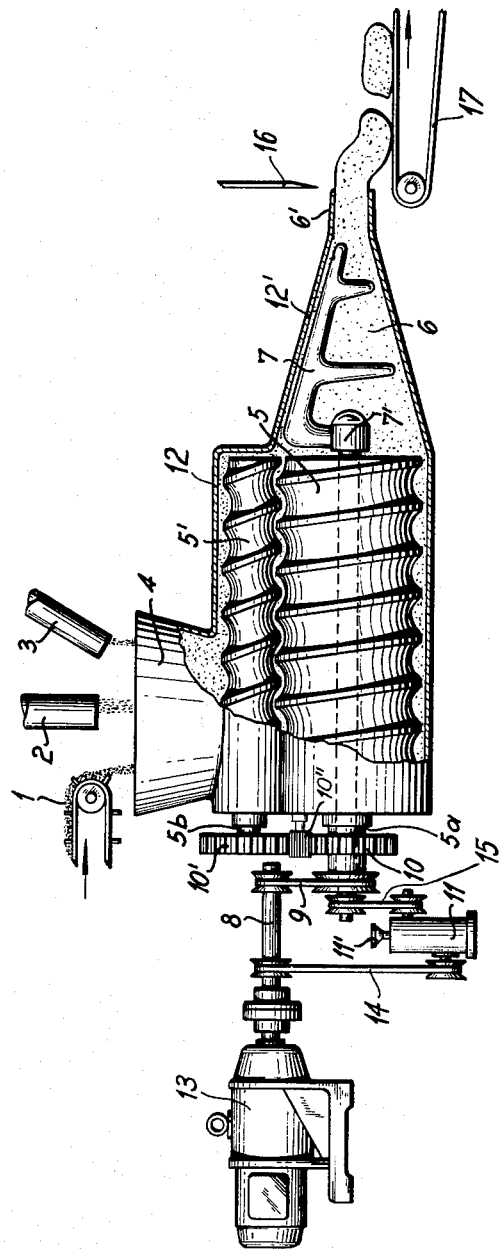
INVENTORS
FRIEDRICH HAUG
GERHARD MÜLLER
By Haar and Nydick
ATTORNEYS 3,203,370
DOUGH MIXING AND KNEADING MACHINE
Friedrich Haug, Stuttgart-Weilimdorf, and Gerhard Müller, Asperg, Wurttemberg, Germany, assignors to Werner & Pfleiderer, Stuttgart-Feuerbach, Germany, a firm of Germany
Filed Sept. 18, 1962, Ser. No. 224,424
Claims priority, application Germany, Oct. 11, 1961, W 30,863
5 Claims. (Cl. 107—30)

The present invention relates to a dough mixing and kneading machine, and more particularly, to a dough kneading and mixing machine in which the materials or components for preparing the dough such as flour, liquid, salt, and a dough raising agent, for instance yeast, etc., are delivered to the mixing and kneading chamber of the machine by means of a conveyor worm or screw, the conveying action of which also forces the finished dough out of the mixing and kneading chamber, the mixing and kneading within the chamber being effected by means of a rotary agitator in the chamber.

Machines for continuously preparing dough of the general kind above referred to are already known, but machines as now known are not entirely satisfactory as to construction and function. In such machines, the conveyor worm merely serves the purpose of transporting the dough forming materials into the mixing and kneading chamber and discharging the finished dough from that chamber.

Extensive practical tests have shown that the components of the dough to be delivered to the chamber do not reach the same in the required uniform distribution and that occasionally the delivery of the components is interrupted at least temporarily due to the formation of rolls of material along the entire length of the conveyor worm. In such an event, the machine is not capable of handling the materials or components which are fed to the hopper of the machine, continuously and in constant quantities and as a result the hopper of the machine will overflow and the dough discharged at the outlet end of the mixing and kneading chamber does not have the required uniformity and quality.

It is the broad object of the invention to provide a novel and improved dough mixing and kneading machine of the general kind above referred to which is free of the aforepointed out disadvantages and which will produce a uniform quantity and quality of dough in continuous operation.

A more specific object of the invention is to provide a novel and improved dough mixing and kneading machine of the general kind above referred to in which the dough forming materials or components are subjected to a preliminary mixing and kneading action before reaching the mixing and kneading chamber, thereby contributing to the thoroughness of the mixing of the components and materials before the same leave the machine as finished dough.

Another more specific object of the invention is to provide a novel and improved dough mixing and kneading machine of the general kind above referred to which is self-cleaning thereby simplifying the maintenance of the machine and increasing the efficiency thereof.

Still another more specific object of the invention is to provide a novel and improved dough mixing and kneading machine of the general kind above referred to which is simplified in construction and of shorter total length than machines of this kind as heretofore known without sacrifice in the quality of the finished dough delivered by the machine.

The aforementioned objects, features and advantages of the invention and other objects, features and advantages which will be pointed out hereinafter, are attained by providing a second conveyor worm or screw parallel to the aforementioned one and in mesh with the same. The coaction of the two worms results in the preliminary mixing and kneading of the dough forming materials or components before the same reach the mixing and kneading chamber of the machine.

According to another feature of the invention the mixing and kneading chamber of the machine is conically tapered towards the end of the chamber. As a result, the discharge of the mixed and kneaded dough at the outlet end of the chamber is continuously somewhat retarded thereby assuring that the agitator rotating within the chamber always works within a chamber completely filled with the materials to be mixed and kneaded.

According to still another feature of the invention, the rate of rotation of the agitator is adjustable independent of the rate of rotation of the worms so that the rates of rotation of the worms and the agitator relative to each other can be selected in accordance with the best conditions for a specific mixing and kneading operation.

In the single figure of the accompanying drawing a preferred embodiment of the invention is shown by way of illustration and not by way of limitation.

The single figure shows an elevation view, partly in section, of an exemplification of the invention. Only those parts of the machine are shown that are essential for the understanding of the invention.

The materials required for the preparation of dough are fed to a hopper 4 of the machine continuously and in controlled quantities. Suitable means for metering the supply of the materials are well known in the art and do not constitute part of the invention. There is indicated at 1 the feed of flour, at 2 the feed of liquid and at 3 the feed of a dough-raising agent such as yeast.

The materials as they are continuously fed by means of the hopper to the inlet end of a conveyor worm or screw 5 and are pushed by the worm toward the outlet end of the worm and thus toward a dough mixing and kneading chamber 6. An agitator 7 is rotatably mounted within chamber 6. As was previously explained, the purpose of the agitator is to effect an intimate mixture of the materials fed into chamber 6 and also to subject the mixture to an intensive kneading action to produce a dough which is as homogeneous as possible.

In order to assure such mixture of the materials and kneading of the mixture, a second conveyor worm or screw 5' is provided according to the invention. The second worm is rotatable about an axis parallel to the rotational axis of worm 5 and is in mesh with worm 5. The inlet end and the outlet end of worm 5' are adjacent to the inlet end and the outlet end, respectively, of worm 5, as is evident from the figure. Both worms are disposed in a common housing 12 which is continued by a part 12' defining the mixing and kneading chamber 6. The two worms are rotated in the same direction, as will be more fully explained hereinafter.

Since worms 5 and 5' are in mesh and rotate in the same direction, the relative velocity between the worms is twice the peripheral velocity thereof, thereby providing a highly efficient cleaning effect and a very good kneading and mixing action. Furthermore, the conveying force of the worms conveys the materials forwardly and into chamber 6, whereby they are subjected to a final intensive mixing and kneading action. The coaction of the two worms also prevents the formation of rolls along the turns of worm 5. Due to the pre-mixing and pre-kneading of the dough prior to chamber 6, obviously the mixing and kneading action in that chamber will be more thorough and uniform than in a machine in which the materials are fed to chambers 6 without being pre-mixed and pre-kneaded and often not even in uniform distribution.

Agitator 7 is mounted on a drive shaft 7' which extends through the drive shaft 5a of worm 5, freely rotatable in reference thereto. Shaft 5a is drivingly coupled by gears 10 and 10' and an intermediate gear 10" with a drive shaft 5b for worm 5' and the drive for both worms is derived by means of a belt 9 from the drive shaft 8 of a motor 13. As is evident, gear train 10, 10' and 1" causes rotation of both worms in the same direction. Of course, it would also be possible and it is within the scope of the invention to replace belt drive 9 by a gear drive.

The drive for agitator shaft 7' is also derived from motor 13, but a speed regulator 11 is interposed between motor shaft 8 and agitator drive shaft 7'. The regulator is coupled with motor shaft 8 by a belt 14 and with drive shaft 7' by a belt 15. Again gear drives may be employed instead of the illustrated belt drives.

As is evident, regulator 11 permits an adjustment of the rate of rotation of agitator 7 independent of the rate of rotation of worms 5 and 5'. A control wheel 11' is shown to indicate means for adjusting regulator 11. The regulator should be visualized as being of conventional design. A stepless or gradual type of regulator was found to be particularly suitable. Rotation of wheel 11' in one or the other direction will vary the transmission ratio between the input shaft and the output shaft of regulator 11, whereby the rotational speed of agitator drive shaft 7' can be varied independently of the rotational speed of worm shafts 5a and 5b.

The provision of regulator 11 permits adjustment of the relative rates of rotation of the worms and the agitator during operation of the machine in a manner such that the best operational conditions can be obtained, and in particular in a manner such that the dough discharged at the outlet end 6' of chamber 6 is always thoroughly mixed and kneaded and in the form of a strand or rope. The strand of dough may be cut to suitable pieces by an automatic cutting device of conventional and suitable design, indicated at 16 and carried away by means of a conveyor band 17 as indicated.

Chamber 6 is conically tapered toward the outlet end 6'. As a result, the dough as it is being pushed by worm 5 towards the outlet end is retarded. This has the advantage that chamber 6 is always completely filled with the materials to be worked upon by agitator 7 thus improving the mixing and kneading action thereof. The cross-sectional area of outlet end 6' is selected so that the quantity of dough which is discharged through that end is never in excess of the quantity of premixed and pre-kneaded materials fed into chamber 6 which quantity, in turn, is determined by the conveying capacity of worm 5.

Due to the afore-explained premixing and prekneading of the materials by the coaction of worms 5 and 5', the length of chamber 6 and the agitator 7 therein may be less than is possible with machines as heretofore known, whereby the total length of the machine may be correspondingly reduced. As also previously pointed out, worm 5 and worm 5' clean each other due to the mutual engagement of the respective worm turns.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. A machine for mixing dough forming materials supplied to the machine and kneading the dough, said machine comprising a dough mixing and kneading chamber having an inlet and an outlet, an agitator rotatably mounted within said chamber, a first rotary conveyor worm having an inlet and an outlet for feeding the dough forming materials to the inlet of said chamber and forcing the mixed and kneaded dough out of the outlet of the chamber, a second conveyor worm having an inlet and an outlet mounted rotatably about an axis parallel to but spaced apart from the rotational axis of the first worm and in mesh with the same, drive means for rotating said conveyor worms in the same direction to effect self-cleaning thereof; means for feeding the dough-forming materials to the inlets of the conveyor worms, and a common housing for both said worms whereby said rotating first and second worm subject the dough forming materials supplied to the worms to a pre-mixing and pre-kneading action prior to the final mixing and kneading action in said chamber.

2. A dough mixing and kneading machine according to claim 1 wherein said chamber is conically tapered along its entire length toward the outlet end thereof.

3. A dough mixing and kneading machine according to claim 1 and comprising drive means for rotating said worms, drive means for rotating the agitator, and a regulating means for regulating the rotational speed of the agitator independent of the rotational speed of the worms.

4. A dough mixing and kneading machine according to claim 3 wherein said regulating means is a gradually adjustable speed control means.

5. A dough-mixing and kneading machine according to claim 1 wherein the rotational axes of said conveyor worms and said agitator are parallel.

References Cited by the Examiner

UNITED STATES PATENTS

| | | | |
|---|---|---|---|
| 509,987 | 12/93 | Wilcox | 107—14.4 |
| 2,620,752 | 12/52 | Braibanti et al. | 107—14.4 |

FOREIGN PATENTS

| | | |
|---|---|---|
| 353,240 | 7/31 | Great Britain. |
| 860,335 | 12/52 | Great Britain. |

WALTER A. SCHEEL, *Primary Examiner.*

CHARLES A. WILLMUTH, ROBERT E. PULFREY,
*Examiners.*